US009544689B2

(12) United States Patent
Fisher et al.

(10) Patent No.: US 9,544,689 B2
(45) Date of Patent: Jan. 10, 2017

(54) WIRELESS SPEAKER SYSTEM

(71) Applicant: Harman International Industries, Inc., Stamford, CT (US)

(72) Inventors: Mark Fisher, Sherman Oaks, CA (US); James Garrett, Simi Valley, CA (US); Armando Martinez, Castaic, CA (US); An Nguyen, West Hills, CA (US)

(73) Assignee: Harman International Industries, Inc., Stamford, CT (US)

( * ) Notice: Subject to any disclaimer, the term of this patent is extended or adjusted under 35 U.S.C. 154(b) by 47 days.

(21) Appl. No.: 14/471,482

(22) Filed: Aug. 28, 2014

(65) Prior Publication Data

US 2016/0066093 A1     Mar. 3, 2016

(51) Int. Cl.
*H04R 3/12* (2006.01)
*H04R 5/04* (2006.01)

(52) U.S. Cl.
CPC ........ *H04R 3/12* (2013.01); *H04R 5/04* (2013.01); *H04R 2420/07* (2013.01)

(58) Field of Classification Search
None
See application file for complete search history.

(56) References Cited

U.S. PATENT DOCUMENTS

| 6,631,410 B1 | 10/2003 | Kowalski et al. | |
| 8,054,987 B2 * | 11/2011 | Seydoux | H04W 8/005 381/77 |
| 8,768,252 B2 * | 7/2014 | Watson | H04R 5/02 381/300 |
| 2004/0223622 A1 * | 11/2004 | Lindemann | H04R 5/04 381/79 |
| 2007/0223725 A1 | 9/2007 | Neumann et al. | |
| 2008/0092204 A1 * | 4/2008 | Bryce | H04N 7/163 725/143 |
| 2008/0291891 A1 * | 11/2008 | Jerlhagen | H04L 43/0864 370/350 |
| 2009/0154739 A1 | 6/2009 | Zellner | |
| 2009/0238375 A1 * | 9/2009 | Pilati | H04L 1/004 381/79 |
| 2011/0129048 A1 * | 6/2011 | Barbe | H04J 3/0658 375/371 |
| 2013/0343568 A1 * | 12/2013 | Mayman | G06F 1/1632 381/77 |

FOREIGN PATENT DOCUMENTS

| TW | 474314 U | 3/2014 |
| WO | 2011031910 A1 | 3/2011 |

OTHER PUBLICATIONS

Extended European Search Report from corresponding European application No. 15181492.8, dated Jan. 18, 2016, 8 pages.

* cited by examiner

*Primary Examiner* — Paul Huber
(74) *Attorney, Agent, or Firm* — Brooks Kushman P.C.

(57) ABSTRACT

A wireless speaker system may include a primary speaker including a first transceiver and a second transceiver and programmed to receive audio data from a user device at the first transceiver, and at least one secondary speaker including a receiver and programmed to receive a wireless signal including the audio data from the primary speaker at the receiver, each speaker configured to transmit audio signals consistently there between based on the received audio data.

4 Claims, 6 Drawing Sheets

WIRELESS SPEAKER SYSTEM

TECHNICAL FIELD

Described herein is a wireless speaker system.

BACKGROUND

Loudspeakers are used to emit sound based on an audio input signal. The audio input signals may be supplied from any number of sources and may be in any number of forms (e.g., electronic files such as .wav, .mp3, etc.). Often times, multiple loudspeakers may be desired to allow sounds to reach across a large physical area. For example, multiple speakers may be used so that sound can be heard throughout a large room or auditorium, or across a large outdoor area such as an outdoor patio, pool area, etc. Existing systems, however, require the speakers to be tethered together by a wire.

SUMMARY

A wireless speaker system may include a primary speaker including a first transceiver and a second transceiver and programmed to receive audio data from a user device at the first transceiver, and at least one secondary speaker including a receiver and programmed to receive a wireless signal including the audio data from the primary speaker at the receiver, each speaker configured to transmit audio signals consistently there between based on the received audio data.

A speaker for a wireless speaker system may include a receiver configured to receive a first wireless signal from a user device, the wireless signal including audio data, a transmitter configured to transmit another second wireless signal including the received audio data; and a transducer configured to transmit an audio signal based on the received audio data.

A speaker system may include a primary speaker including at least one controller programmed to transmit enrollment data to a secondary speaker, receive audio data from a user device over a first interface, transmit the received audio data to the secondary speaker over a second interface, and transmit, concurrently with audio emissions at the secondary speaker based on the transmitted audio data, an audio signal based on the received data from the user device.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is an active wireless speaker system including primary and secondary loudspeakers that are configured to play audio signals. A primary speaker may communicate with a user device via a first communication interface to receive audio data indicative of a sound file. The primary speaker may then transmit the audio data to at least one other secondary speaker via a second communication interface. The primary speaker and the secondary speaker may transmit sound based on transmitted audio data in tandem. Thus, several speakers may play audio content across a wide area. Additionally, each of the speakers may be programmed to transmit and/or receive data at a predefined frequency, thus creating user friendly, portable, wireless speaker system. The speakers may be weather and water resistant so as to be used both indoors and out. Additionally, the speakers may include a rechargeable power supply so that the system may be used even without access to an external power supply.

Because the speakers are extremely durable and weather and water resistant, the speakers may be easily transported to various destinations and environments. The speaker system may be used with a variety of applications, including home audio systems, audio for video system (i.e., TV surround sound), computer and gaming systems, mobile devices, outdoor use including patio, camping, pool, beach, and other uses. Each of the speakers may play left or right channel content, as well as both left and right channel content. Furthermore, speakers may be added to the system in pairs so that each speaker within the system plays consistent sound across a large area.

Figure 1:
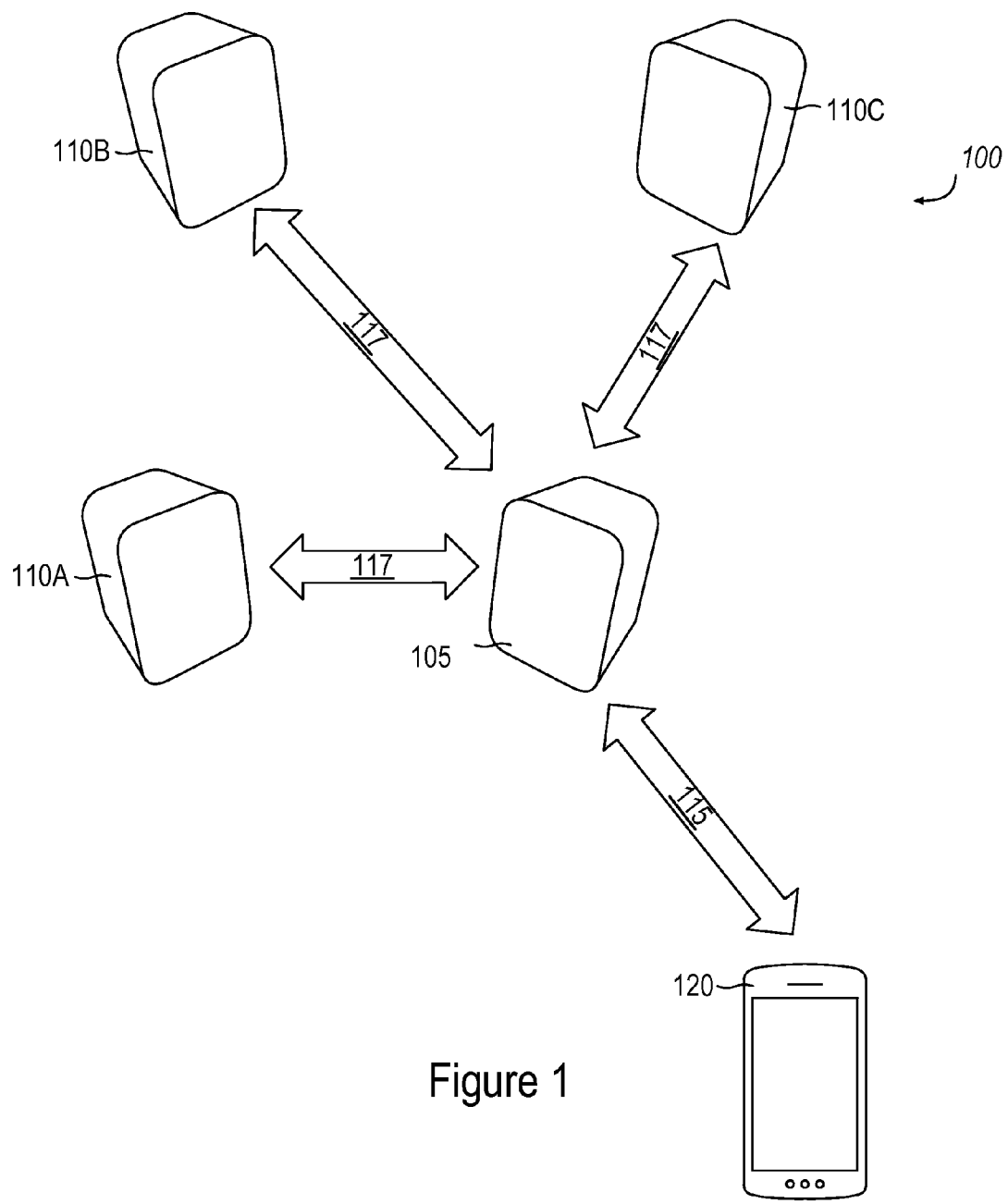
FIG. 1 illustrates a speaker system in accordance with one embodiment.

FIG. 1 is a speaker system 100 including at least one primary speaker 105 and at least one secondary speaker 110 (shown in FIG. 1 as secondary speakers 110A, 110B and 110C) in accordance to one embodiment. The speakers 105, 110 may be portable speakers having a weatherized design for use both indoors and outdoors. The speakers 105, 110 may each include a transceiver, or other communication component, configured to transmit and/or receive wireless signals. The speakers 105, 110 are described in more detail below with respect to FIG. 2. The user device 120 may be a device capable of maintaining media content such as audio data or sound files, MP3's, etc., and may also be capable of streaming data including audio and/or video content. The user device 120 may be configured to transmit the content to the speakers 105, 110. A user device 120 may transmit wireless signals for audio data to the speakers 105. For example, the user device 120 may include a processor and a memory and may maintain a database of sound files. The sound files may be organized into various playlists.

The user device 120 may communicate with the primary speaker 105 over a first interface 115. The first interface 115 may be a wireless communication interface or wireless network, such as BLUETOOTH™. The first interface 115 may also be other wireless networks such as Wi-Fi, Local Area Network, etc. Prior to the user device 120 communicating the audio data to the primary speaker 105, the user device 120 may undergo an associating/pairing operation with the primary speaker 105.

The primary speaker 105 may communicate with each of the secondary speakers 110 via a second interface 117. The second interface 117 may be a separate wireless communication interface from the first interface 115 such as radio. Data may be transmitted over the second interface 117 at a predefined frequency between the speakers 105, 110.

While FIG. 1 illustrates a single primary speaker 105 and three secondary speakers 110A, 110B 110C, the speakers may be recognized as being part of a pair. For example, as shown in FIG. 1, the primary speaker 105 and a secondary speaker 110A, may form a speaker pair, and a secondary speaker 110B and a secondary speaker 110C may form a another speaker pair. Thus, the system may include a primary speaker pair and a secondary speaker pair. Although two pairs are shown in FIG. 1, additional pairs may be added to the speaker system 100. Additionally or alternatively, single speakers 110 may also be added to the system.

Figure 2A:
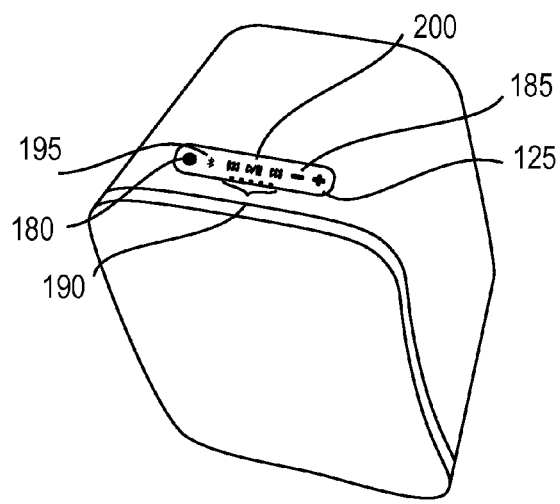
FIGS. 2A and 2B illustrates a speaker within the speaker system in accordance with one embodiment.
Figure 2B:
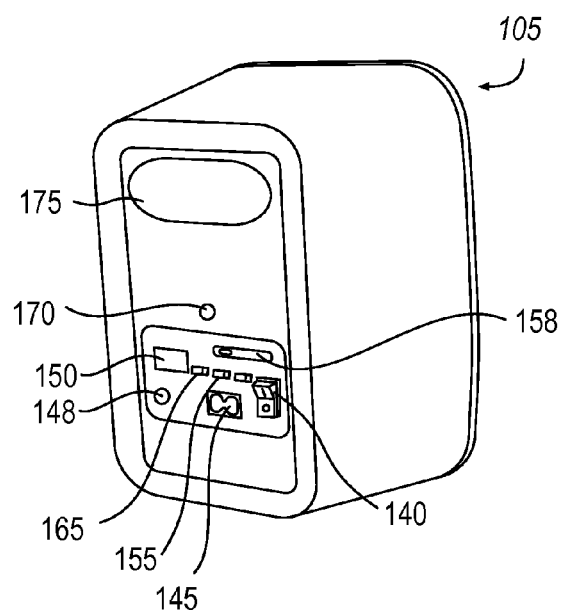

Referring to FIGS. 2A and 2B, the primary speaker 105 of FIG. 1 is shown in more detail. While FIGS. 2A and 2B show a primary speaker 105, similar features may also be included in the secondary speakers 110. The speakers 105, 110 may be an outdoor, or all-weather speaker, that is both weather and water resistant. The speakers 105, 110 form a cube-like shape and may have a height of, for example, approximately 236 mm, a width of approximately 164 mm and a depth of approximately 141 mm. The speakers 105, 110 may also form other shapes including spherical, conical, or any other shape specific to an implementation of the embodiments disclosed herein. The speakers 105, 110 may each include a transducer with up to, for example, approximately 100 Watts of power output and a large sound pressure level. Various other power levels may be accommodated such as approximately 3-500 Watts. The speaker 105 may include a portable power supply (not shown) such as a battery for providing power to the speaker components. The power supply may be a rechargeable battery. The battery may be an internal and/or external battery. The power supply may provide power to the speaker 105 for up to at least approximately 10 hours of playtime.

It is recognized that the battery may be charged via an external charge source such as a 2V-5A external charger at a charge port 150 (shown in FIG. 2B). The battery may also be removable from the speaker and charged at a charge base external to the speaker 105. Additionally or alternatively, wireless charging systems may be used to the charge the battery both internal and external to the speaker 105. In other examples, the external charge source may also be another source such as an AC/DC, solar, kinetic, wireless, USB, etc.

FIG. 2B shows a second, or rear, side of the primary speaker 105. While FIG. 2B is described as referring to the primary speaker 105, it is recognized that the secondary speaker 110 may include similar components of the primary speakers 105 in accordance with those illustrated in FIG. 2B. The speaker 105 may include a power button 140 to turn the power of the speaker on and off. The power button 140 may also trigger communication between speakers 105, 110 in order to pair, or synchronize, the speakers, as described below. The speaker 105 may include at least one charge port 145, 150 for receiving a charge connection such as an alternating current (AC) input 145. The charge port may also be a universal serial port (USB) port 150, or other suitable port type. The speaker 105 may be charged both during use and during non-use. The speaker 105 may also include an auxiliary input 148 (e.g., a 3.5 mm male mini-jack input) for additional audio sources. Several switches may also be available such as a stereo or summed mono switch 155 and a boundary gain switch 165. Primary speakers 105 may include a mode switch 158 for switching between a primary mode (where the speaker performs as a primary speaker communicating with the user device 120 via the first interface 115) and a secondary mode (where the speaker performs as a secondary speaker communicating with another, primary speaker via a second interface 117). The switch 158 may be a separate switch as shown in FIG. 2B. The switch 158 may be any type of switch such as a button, sliding switch, toggle, etc. The switch 158 may, additionally or alternatively, also be included in the display interface 125. A portion of the rear side may be formed of rubber so as to provide a barrier between the speaker 105 and a wall if the speaker is mounted to a wall or other vertical surface. For vertical mounting, the speaker 105 may include a standard threaded insert 170. Further, for easy transport, a bass port 175 may be formed within a rear of the speaker 105 that may also serve as a handle.

An interface 125, as shown in FIG. 2A, may include a plurality of indicators or icons for communicating the status to a user. The interface 125 may include a power indicator 180, which may include backlit illumination via a light emitting diode (LED). The interface 125 may also have volume buttons 185 for adjusting or controlling an output volume of the speakers 105, 110, as well as other playback buttons 200 which may include, for example, each of a forward, rewind, play and pause button. The interface 125 may also include a battery state of charge (SOC) indicator 190 to illustrate the charge level of the battery. This indicator 190 may include a plurality of LEDs. As the state of charge decreases, one or more of the plurality of LEDs may be disabled. Conversely, a fully charged battery may result in all of the plurality of LEDs being activated or enabled (i.e., becoming illuminated). That is, a fully charged battery may result in all of the LEDs being lit, while a nearly depleted battery may result in only one LED being lit. If the speaker 105, 110 is turned off, none of the LEDs may be lit. Although not shown, other indicators may be used to show the relative state of charge, such as a battery symbol, a clock symbol, etc. Further, the interface 125 may include a network indicator 195, such as a BLUETOOTH™ icon, that may be illuminated when the speaker 105 is in communication with the user device 120. The network indicator 195 may also be a depressible switch, similar to the power and volume buttons 180, 185, such that a depression of the button may initiate pairing with the user device 120. Additionally or alternatively, the pairing may be initiated upon power up of the speaker 105 (e.g., the power button 140 has been activated). Pairing may include establishing the predefined frequency for the second interface 117. Once paired, speakers may communicate with each other over the predefined frequency. This is described in more detail below with respect to FIGS. 5-7.

The display interface 125 may be any type of display such as an LED screen, or an organic LED (OLED) screen, a liquid crystal display (LCD) screen, a rubberized backlit screen, plasma display panel, etc. The display interface 125 may be integrated within the primary speaker 105, as shown in FIG. 2A. The display interface 125 may also be a separate device.

Figure 3:
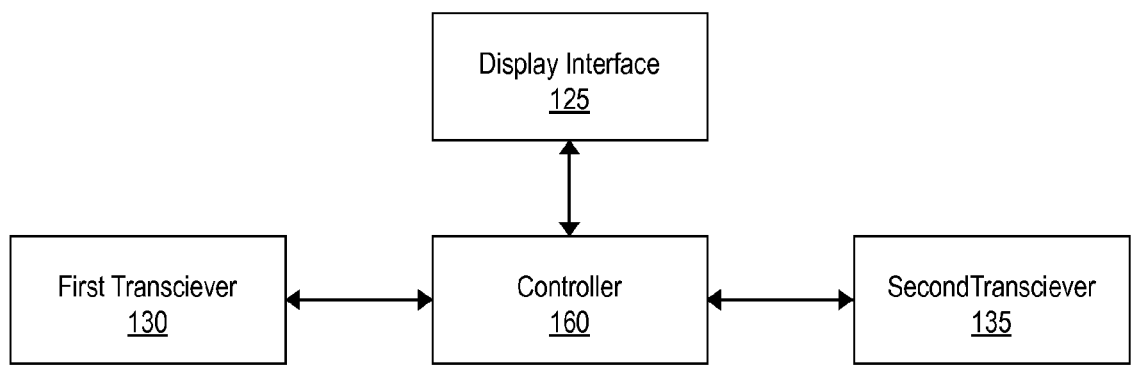
FIG. 3 illustrates a block diagram of a speaker's components in accordance with one embodiment.

FIG. 3 is a block diagram of components of the primary speaker 105. As explained, the primary speaker 105 may include an interface 125. The primary speaker 105 may also include a first transceiver 130 and a second transceiver 135.

The interface 125, first transceiver 130 and second transceiver 135 may each be coupled to or in communication with a controller 160.

The transceivers 130, 135 may be a radio frequency (RF) module configured to transmit and receive data. In another example, the first transceiver 130 may be a BLUETOOTH™ module configured to communicate with the user device 120 using a wireless standard such as, but not limited to, a BLUETOOTH™ communication protocol, BLUETOOTH Smart®, and/or near field communication protocols. Once the primary speaker 105 and the user device 120 are paired, the user device 120 and the first transceiver 130 may exchange information or data using Bluetooth™. Thus, audio data from the user device 120 may be transmitted to the primary speaker 105. The first transceiver 130 may also be another type of radio frequency transceivers such as a Zigbee™ transceiver, or Wi-Fi™ modules.

The controller 160 may maintain device data for each user device 120 in memory that may be paired with the first transceiver 130. Upon re-connect, the controller 160 may recall the device data for the particular user device 120 in response to identifying information provided by the particular user device. Further, upon receiving pairing data from the user device 120, the controller 160 may automatically wake the speaker 105 and begin pairing. The speaker 105 may also be activated in response to an auxiliary input at the auxiliary port 145 receiving an auxiliary input.

The second transceiver 135 may be an RF transceiver configured to receive and/or transmit data. In the example of FIG. 1, both the primary speaker 105 and the secondary speakers 110 may include a second transceiver 135. The second transceiver 135 of the primary speaker 105 may be instructed by the controller 160 to transmit the audio data. The second transceivers 135 within each of the secondary speakers 110 may be configured to receive the audio data transmitted from the primary speaker 105 over the second interface 117. The secondary speakers 110 may then play the audio of the received audio data. Thus, the user device 120 may transmit the audio data to the primary speaker 105 via the first interface 115 and the primary speaker 105 may in turn transmit the audio data to the secondary speakers 110 via the second interface 117.

The second transceiver 135 may be programmed to transmit and receive audio data at a specific, predefined frequency or frequency range. Each of the primary and secondary speakers 110 within a system 100 may be programmed at the same frequency. Thus, when the primary speaker 105 transmits audio data at the predefined frequency, each secondary speaker 110 associated with the primary speaker 105 may receive the audio data and in turn emit an audio signal indicative of the data. In the example of FIG. 1, all four speakers 105, 110 may have a second transceiver 135 programmed at the same predefined frequency. Thus, multiple secondary speakers 110 may be in communication with a single primary speaker 105.

Because the speakers 105, 110 may be pre-programmed with a predefined frequency, upon setup of the system 100, the speakers 105, 110 may automatically pair. That is, once the speakers 105, 110 are placed in their desired location and the power has been turned on, the transceivers 135 therein may automatically transmit and listen for signals at the predefined frequencies. Thus, very little know-how or setup is required of the user. Further, little to no interference will be recognized because of the predefined frequency. While secondary speakers 110 may be associated with a primary speaker during manufacturing and packaging, secondary speakers 110 may also undergo an association process so that a single secondary speaker 110 may be paired with another speaker or speakers. This is described in more detail below with respect to FIG. 6.

While the transceivers 130, 135 are described herein as such, the transceivers 130, 135 may also include separate devices for transmitting and receiving RF signals, such as a transmitter-receiver. Moreover, in some examples, and to simplify a design, the transceivers 130, 135 may function and include only a receiver or transmitter. For example, it may not be necessary for each speaker 105, 110 to both transmit and receive data. The primary speaker 105 may only need to transmit the audio data to the secondary speakers 110. Thus, the second transceiver 135 of the primary speaker 105 may be a transmitter. Similarly, the secondary speakers 110 may only need to receive data, not transmit it, and thus the second transceiver 135 at the secondary speakers 110 may be a receiver or antenna.

The controller 160 may include a processor and a memory and may communicate with the interface 125 and transceivers 130, 135. The controller 160 may maintain data received from the transceivers 130, 135, as well as other data such as volume data, feedback data, speaker specific data including the predefined frequency, battery state of charge, etc. The controller 160 may be responsible for certain signal processing including feedback suppression, and other acoustic manipulation and adjustment of the audio data. The controller may receive the audio data from the user device 120 and may in turn instruct the second transceiver 135 to transmit the audio data. The audio data may include stereophonic sound, or stereo sound, such that both a left and right channel content are included in the data and played by each speaker. Accordingly, consistent sound between the speakers 105, 110 may be achieved over a wide area.

The second transceiver 135 at the primary speaker 105 may also transmit other playback data including the volume data and feedback data maintained by the controller 160. By transmitting the playback data, the secondary speakers 110 may be synced with the primary speaker 105 such that each speaker may maintain the same volume level. Additionally or alternatively, each speaker 105, 110 may have an override volume wherein each speaker volume may be adjusted individually. This override volume may be adjusted by a manual button on each speaker (not shown) or an interface on each speaker (similar to interface 125 but not shown on secondary speakers 110).

Volume data may also be received via the first interface 115 from the user device 120. The user device 120 may include volume buttons 185 and controls that may also be used to wirelessly adjust the volume of the speakers 105, 110. Once such volume data is received, the primary speakers 105 may transmit the data to the other secondary speakers 110 over the second interface 117.

Figure 4:
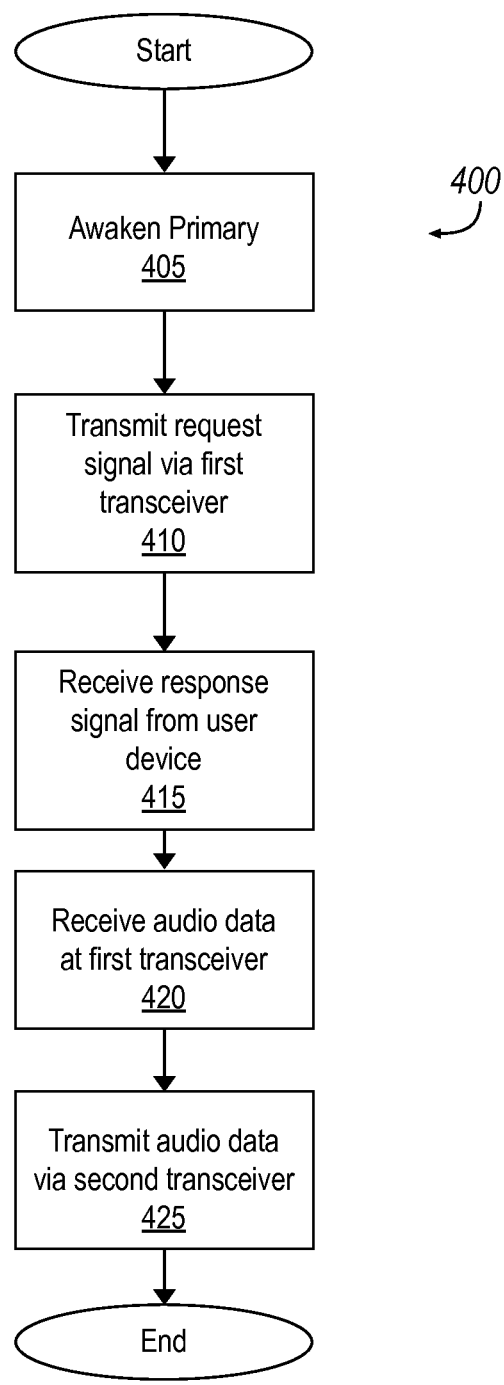
FIG. 4 illustrates a flow diagram for the operation of the speaker system.

FIG. 4 is a flow diagram for the operation of the speaker system 100. The process 400 begins at block 405 where the primary speaker 105 is activated. The primary speaker 105 may be activated in response to the power button 140 on the primary speaker 105 being selected. Additionally or alternatively, the primary speaker 105 may be activated in response to the first transceiver 130 detecting the presence of a wireless device, e.g., a BLUETOOTH™ enabled device, such as the user device 120. This detection may include the transceiver 130 receiving a signal from the user device 120. The primary speaker 105 may also be activated in response to a detected auxiliary input.

At block 410, the first transceiver 130 may transmit a request signal to the user device 120. The request signal may be received by the user device 120 and may include a speaker identifier such as a frequency range.

At block 415, the first transceiver 130 may receive a response signal from the user device 120. The response signal may validate the primary speaker 105 based on the request signal and may create a wireless network between the user device 120 and the first transceiver 130. The network may be a BLUETOOTH™ network.

At block 420, once the network has been created, the first transceiver 130 may receive audio data from the user device 120. The audio data may be data indicative of various audio content such as sound files. Additionally or alternatively, other data such as volume data may be transmitted within or along-side the audio data.

At block 425, the controller 160 may instruct second transceiver 135 at the primary speaker 105 to transmit the audio data at the predefined frequency. The volume data may also be transmitted from the second transceiver 135. The audio data may in turn be received at the second transceivers 135 of the secondary speakers 110 and the controller 160 within the secondary speaker 110 may in turn emit audio signals (e.g., play the sound file.) Each secondary speaker 110 and primary speaker 105 may play the sound file concurrently.

Thus, the audio data may be transmitted to the speaker system 100 via the first interface 115 and in turn the primary speaker 105 may transmit the audio data to the secondary speakers 110 over the second interfaces 117. By transmitting the audio data between second transmitters 135 at a predefined frequency, the speaker system 100 may be easily set up by users. The users may simply place the speakers in the desired locations, turn each speaker on by depressing the power button 140, and the secondary speakers 110 may automatically pair with the primary speaker 105, after a manual connection.

Figure 5:
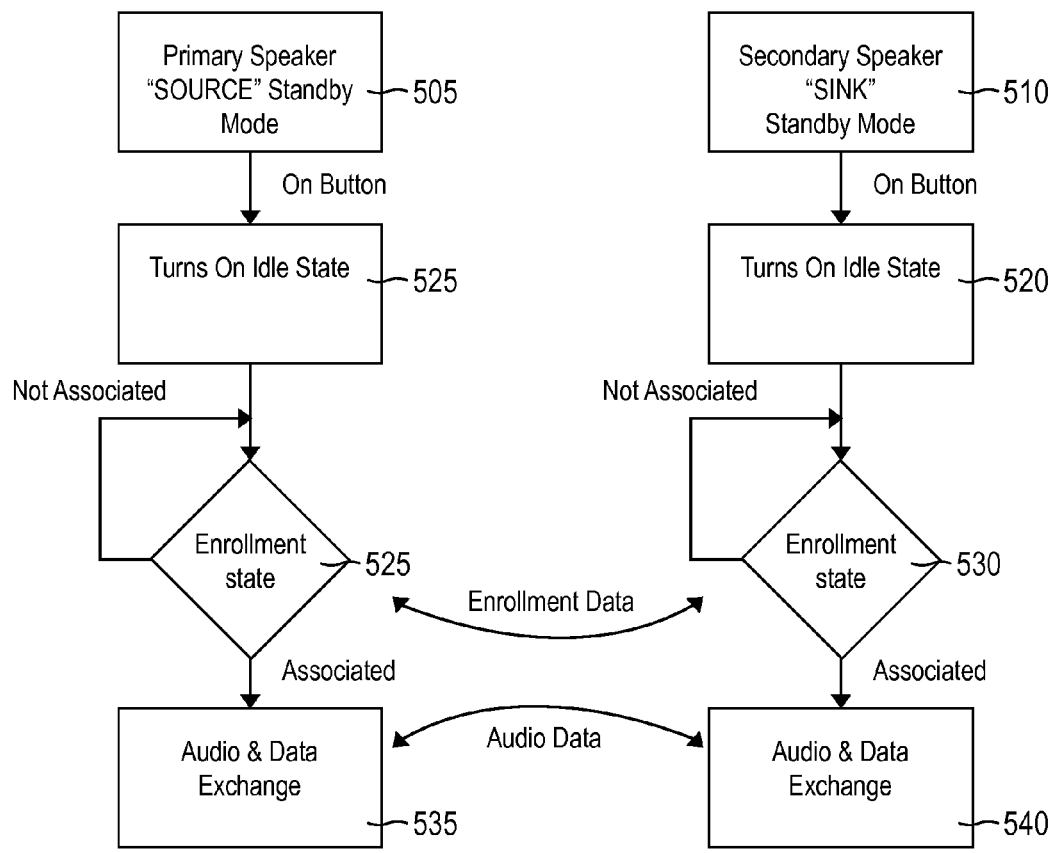
FIG. 5 illustrates a flow diagram for pairing a speaker pair.

FIG. 5 is a flow diagram for pairing a speaker pair (e.g., speakers 105 and 110A). Block 505 may represent the primary speaker 105 and block 510 may represent the secondary speaker 110A, each in a standby mode. The primary speaker 105 may be considered the source speaker while the secondary speaker 110A may be considered the sink speaker. Upon pressing the power button 140 on each of the speakers 105, 110A, each speaker may enter an idle mode, as indicated in block 515 and 520. The buttons 140 may be depressed simultaneously with each other, or independently and non-concurrently with each other. That is, the button 140 on the primary speaker 105 may be pressed, and later, the button 140 on the secondary speaker 110A may be pressed. The process may operate similarly, regardless of the order that the buttons 140 on each speaker 105, 110 is depressed. At blocks 525 and 530, the speakers 105, 110A may enter an enrollment state. During the enrollment state, the speakers 105, 110A may attempt to communicate with each other by transmitting and/or receiving data. For example, the primary speaker 105, upon power-up, may initiate transmission of certain request signals. The request signals may be transmitted via the transmitter/antenna. The secondary speaker 110A may receive the request and return a response. Upon receiving the response, the primary speaker 105 may recognize the secondary speaker 110A by response data included in the response. The request and responses may be transmitted over industrial, scientific and medical (ISM) radio bands. These bands may operate, for example, between 2.4 and 900 GHz. Other short range, low power communication protocols such as near field communication, BLUETOOTH™, etc., could also be used by the speakers 105, 110A. The secondary interface 117 may also be used for pairing the speakers 105, 110A, although in the examples described herein, another protocol is used to transmit enrollment data not associated with audio playback. The enrollment data may include the predefined frequency, as well as an identifier unique to each speaker.

If the speakers 105, 110A exchange data, the process proceeds to blocks 535 and 540. If not, the primary speaker 105 continues to attempt to communicate with the secondary speaker 110A.

At blocks 535 and 540, once the enrollment data has been exchanged, the primary speaker 105 may transmit audio data to the secondary speaker 110A via the second interface 117.

The primary speaker 110 may continue to transmit audio data for playback by both speakers 110A until one of the speakers 105, 110A is turned off moved out of range of the other speaker. Because the pairing of the speakers 105, 110A is initiated upon power-up of the speakers, the speakers are easily paired without undue interference or interaction with the user.

Figure 6:
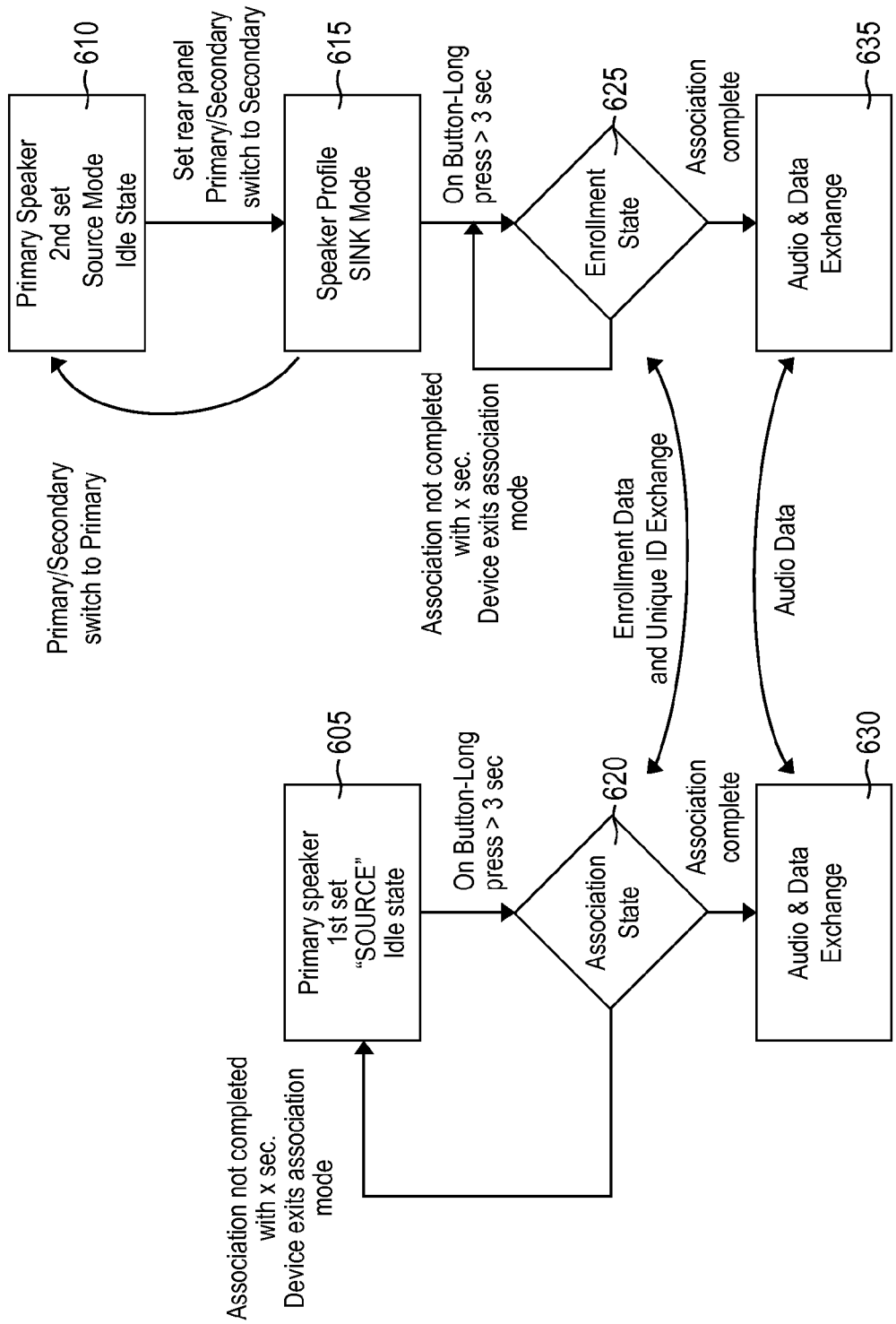
FIG. 6 illustrates a flow diagram for pairing an additional speaker set to the system.

FIG. 6 is a flow diagram for pairing another speaker set to the system 100 (e.g., adding speakers 110B and 110C to the already pair speakers 105, 110A). In this example, the second speaker set 110B and 110C may include a primary speaker (e.g., 110B) and a secondary speaker (e.g., 110C). In other examples, another secondary speaker may be paired with the first pair (e.g., speakers 105, 110A) without a corresponding primary speaker. That is, a single speaker may be added to an existing set of speakers.

The primary speaker 105 of the first set and the primary speaker 110B of the second set may both be considered source speakers. Each of the speakers 105, 110B may be in an idle state at blocks 605 and 610. As explained above, primary speakers may include the mode switch on the rear panel of the speaker. The speakers may switch from a primary mode to a secondary mode. That is, in one situation, the primary speaker may perform as a primary speaker, receiving data via the first interface 115 and transmitting the audio data to the other speakers via the second interface 117. In another situation, the primary speaker may perform as a secondary speaker and receive the audio data from another primary speaker over the second interface 117. In order to pair another primary speaker (e.g., speaker 110B in this example) to another speaker set, one of the primary speakers 105, 110B must be switched to the secondary mode. In this example, by switching the speaker 110B to the secondary mode, the speaker may turn off communication with the first interface 115. That is, the speaker 110B may not communicate with the user device 120.

Referring to block 615, once the mode of speaker 110B has been switched over to perform as a secondary speaker 110B, the speaker 110B may be considered a sink speaker, similar to speaker 110A described in block 510 of FIG. 5. When adding speakers to an already paired speaker set, the pairing may be initiated in response to the power button 140 being held down for a predetermined increment. In this example, the increment may be approximately 3 seconds. This may ensure that the primary speaker 105 recognizes the difference between a request for additional pairing and a request for power down (e.g., shut off of the speaker).

At blocks 620 and 625 the speakers 105, 110B may enter an association state. The association state may be similar to the enrollment state described above with respect to blocks 525 and 530 of FIG. 5. In addition to receiving enrollment data, the primary speaker 105 may receive a unique identifier of the secondary speaker 110B as well as a unique identifier of other speaker that the speaker 110B was previously paired with, if any. For example, a unique identifier for the secondary speaker 110C may be transmitted. This may permit both speakers 110B and 110C to be paired concurrently, without the secondary speaker 110C having to communicate directly with the primary speaker 105 during the association state.

Further, the secondary speaker 110B may receive the unique identifier of the primary speaker 105. Once the identifiers and enrollment data are exchanged, the process may proceed to blocks 630 and 635 and the primary speaker 105 may transmit audio data the newly paired secondary speaker 110B via the second interface 117.

If enrollment data and/or a unique identifier are not received from the secondary speaker 110B within a predefined time period, for example, within 10 seconds, the primary speaker 105 may exit the association state. Likewise, if a unique identifier of the primary speaker 105 is not received by the secondary speaker 110B within a predefined time period, the secondary speaker may exit the association state.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wireless speaker system comprising:
a primary speaker including a first transceiver and a second transceiver and programmed to receive audio data from a user device at the first transceiver; and
at least one secondary speaker including a receiver and programmed to receive a wireless signal including the audio data from the primary speaker at the receiver, each speaker configured to transmit audio signals consistently there between based on the received audio data;
wherein the primary speaker is configured to receive the audio data from the user device via a first interface and wherein the secondary speaker is configured to receive the audio data from the primary speaker via a second interface, the first interface facilitating the transmission of the audio data at a first frequency band and the second interface facilitating the transmission of the audio data over a second frequency band;
wherein an exchange of enrollment data is transmitted between the primary and secondary speakers over a frequency band separate and distinct from the first and second frequency bands.

2. The system of claim 1, wherein the frequency band separate and distinct from the first and second frequency bands is an industrial, scientific and medical (ISM) band.

3. The system of claim 1, wherein the wireless signal includes at least one of volume data, feedback data, and a predefined frequency of the second interface.

4. The system of claim 1, wherein the primary speaker includes a mode switch for instructing the primary speaker to operate in a primary mode where the primary speaker receives the audio data from the user device and a secondary mode where the primary speaker receives the audio data from another primary speaker.

* * * * *